US010511181B1

(12) United States Patent
Chang et al.

(10) Patent No.: US 10,511,181 B1
(45) Date of Patent: Dec. 17, 2019

(54) CHARGING DEVICE AND HANDHELD ELECTRONIC DEVICE BOTH WITH ADAPTIVE CURRENT LIMITING PROTECTION

(71) Applicant: CYBER POWER SYSTEMS, INC., Taipei (TW)

(72) Inventors: Chin-Ching Chang, Taipei (TW); Heng-Chuan Chen, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 0 days.

(21) Appl. No.: 16/165,326

(22) Filed: Oct. 19, 2018

(30) Foreign Application Priority Data

Sep. 17, 2018 (CN) .......................... 2018 1 1081709

(51) Int. Cl.
*H02J 7/00* (2006.01)

(52) U.S. Cl.
CPC .......... *H02J 7/0029* (2013.01); *H02J 7/0052* (2013.01); *H02J 2007/0039* (2013.01); *H02J 2007/0062* (2013.01)

(58) Field of Classification Search
CPC .................. H02J 7/0029; H02J 7/0052; H02J 2007/0039; H02J 2007/0062
USPC ....................................................... 320/107
See application file for complete search history.

(56) References Cited

U.S. PATENT DOCUMENTS

| 2009/0256528 | A1* | 10/2009 | Greening | H01M 10/0525 320/162 |
| 2011/0267726 | A1* | 11/2011 | Ikeuchi | H01M 10/44 361/63 |
| 2015/0355281 | A1* | 12/2015 | Lee | G01R 31/389 320/136 |
| 2015/0364947 | A1* | 12/2015 | Murayama | H02J 5/005 320/108 |
| 2016/0118845 | A1* | 4/2016 | Yeo | H02J 50/12 320/108 |
| 2016/0141907 | A1* | 5/2016 | Mulawski | H02J 7/0022 320/107 |
| 2016/0204631 | A1* | 7/2016 | Houston | H02J 7/0029 320/162 |
| 2016/0204632 | A1* | 7/2016 | Kleine | H02J 7/0031 320/134 |
| 2016/0204642 | A1* | 7/2016 | Oh | H02J 17/00 320/108 |

(Continued)

*Primary Examiner* — Suresh Memula
(74) *Attorney, Agent, or Firm* — Bacon & Thomas, PLLC

(57) ABSTRACT

A charging device and a handheld electronic device both with adaptive current limiting protection are provided. Both of the charging device and the handheld electronic device have a connection interface and an adaptive current limiting protection circuit comprising an impedance unit, a switch, and a control unit. The control unit is electrically coupled to the switch, the impedance unit, and an electrical path connected to a power pin of the connection interface. The control unit stores a plurality of voltage values and a plurality of different corresponding current limit values. The control unit is configured to measure the voltage of the electrical path to obtain a measured voltage, and the control unit is further configured to measure the voltage across the impedance unit to calculate a current value. When the current value reaches the current limit value corresponding to the measured voltage, the control unit turns off the switch.

11 Claims, 6 Drawing Sheets

(56) References Cited

U.S. PATENT DOCUMENTS

2016/0254574 A1* 9/2016 Li ................... H02J 7/007
 320/107
2016/0254686 A1* 9/2016 Steil ................ B60L 58/14
 320/112

* cited by examiner

CHARGING DEVICE AND HANDHELD ELECTRONIC DEVICE BOTH WITH ADAPTIVE CURRENT LIMITING PROTECTION

BACKGROUND OF THE INVENTION

Field of the Invention

The present invention relates to the technical field of current limiting protection, and in particular, to a charging device with adaptive current limiting protection and a handheld electronic device with adaptive current limiting protection.

Description of Related Art

With the popularity of various handheld electronic devices, various corresponding charging devices have also been developed. However, since the charging voltages of different handheld electronic devices may be different, different handheld electronic devices may need to be charged by different charging devices. This causes great trouble in use.

SUMMARY OF THE INVENTION

An object of the present invention is to provide a charging device with adaptive current limiting protection, which is adapted to support different charging voltages and performs current limiting protection under different charging voltages.

Another object of the present invention is to provide a handheld electronic device with adaptive current limiting protection, which is adapted to support different charging voltages and performs current limiting protection under different charging voltages.

To achieve the above object, the present invention provides a charging device with adaptive current limiting protection, which comprises a connection interface, a charging circuit and an adaptive current limiting protection circuit. The connection interface comprises a power pin and a ground pin. The charging circuit comprises a power output terminal and a ground terminal, and the ground terminal is electrically coupled to the reference potential. The adaptive current limiting protection circuit comprises an impedance unit, a switch and a control unit. The impedance unit is electrically coupled between the power pin and the power output terminal, or electrically coupled between the ground pin and the ground terminal. The switch is electrically coupled between the power pin and the power output terminal, or electrically coupled between the ground pin and the ground terminal. The control unit is electrically coupled to the switch and two terminals of the impedance unit, and is electrically coupled to an electrical path between the power pin and the power output terminal. The control unit stores a plurality of voltage values and a plurality of different corresponding current limit values. The control unit is configured to measure the voltage of the electrical path to obtain a measured voltage, and the control unit is further configured to measure the voltage across the impedance unit to calculate a current value. When the current value reaches the current limit value corresponding to the measured voltage, the control unit turns off the switch.

To achieve the above object, the present invention further provides a handheld electronic device with adaptive current limiting protection, which comprises a connection interface, a core circuit and an adaptive current limiting protection circuit. The connection interface comprises a power pin and a ground pin. The core circuit comprises a power input terminal and a ground terminal, and the ground terminal is electrically coupled to the reference potential. The adaptive current limiting protection circuit comprises an impedance unit, a switch and a control unit. The impedance unit is electrically coupled between the power pin and the power input terminal, or electrically coupled between the ground pin and the ground terminal. The switch is electrically coupled between the power pin and the power input terminal, or electrically coupled between the ground pin and the ground terminal. The control unit is electrically coupled to the switch and two terminals of the impedance unit, and is electrically coupled to an electrical path between the power pin and the power input terminal. The control unit stores a plurality of voltage values and a plurality of different corresponding current limit values. The control unit is configured to measure the voltage of the electrical path to obtain a measured voltage, and the control unit is further configured to measure the voltage across the impedance unit to calculate a current value. When the current value reaches the current limit value corresponding to the measured voltage, the control unit turns off the switch.

In order to make the above objects, technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
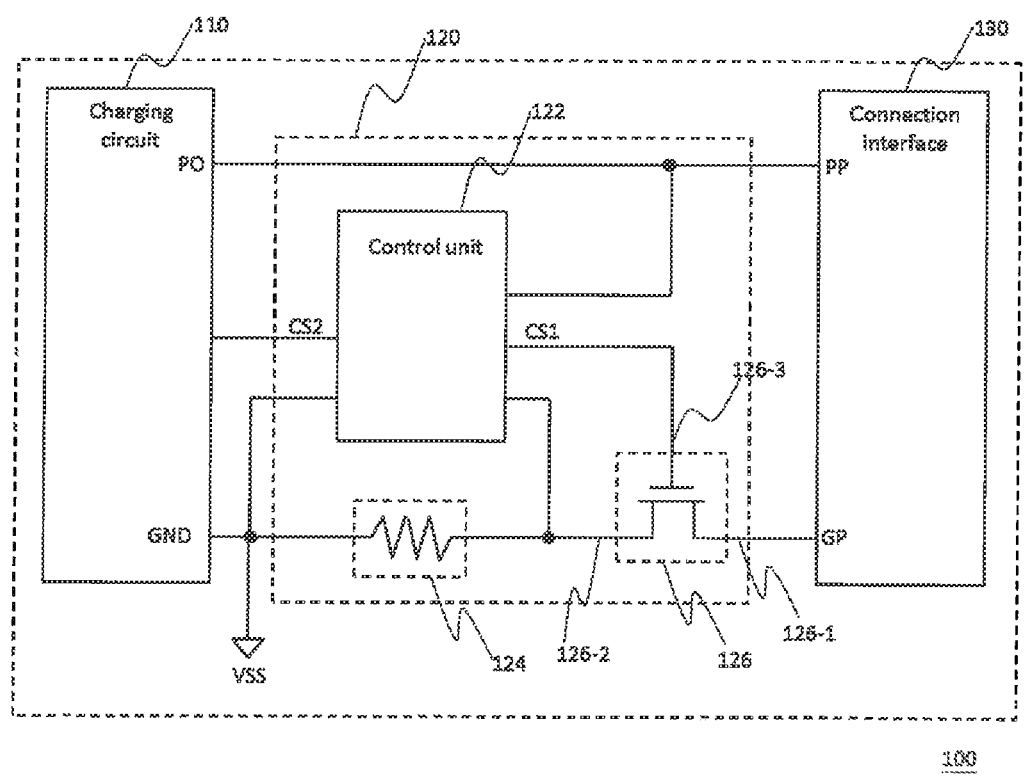
FIG. 1 is a charging device with adaptive current limiting protection according to an embodiment of the present invention.

FIG. 1 is a charging device with adaptive current limiting protection according to an embodiment of the present invention. Referring to FIG. 1, the charging device 100 comprises a charging circuit 110, an adaptive current limiting protection circuit 120, and a connection interface 130. The charging circuit 110 comprises a power output terminal PO and a ground terminal GND, and the ground terminal GND is electrically coupled to the reference potential VSS. This charging circuit 110 is adapted to output different charging voltages from its power output terminal PO. The connection interface 130 comprises a power pin PP and a ground pin GP, and the power pin PP is electrically coupled to the power output terminal PO. The adaptive current limiting protection circuit 120 comprises a control unit 122, an impedance unit 124, and a switch 126. The first terminal 126-1 of the switch 126 is electrically coupled to the ground pin OP, and the impedance unit 124 is electrically coupled between the second terminal 126-2 of the switch 126 and the ground terminal GND.

As for the control unit 122, it is electrically coupled to the control terminal 126-3 of the switch 126 and two terminals of the impedance unit 124, and is electrically coupled to an electrical path between the power pin PP and the power output terminal PO. The control unit 122 stores a plurality of voltage values and a plurality of different corresponding current limit values, as shown in Table 1 below:

TABLE 1

| Voltage value | Current limit value |
| --- | --- |
| 5 V | 3 A |
| 9 V | 2 A |
| 12 V | 1.5 A |

When a handheld electronic device (not shown) is electrically coupled to the connection interface 130, the charging circuit 110 communicates with the handheld electronic device through at least one data pin (not shown) of the connection interface 130, so as to obtain the rated charging voltage of this handheld electronic device. Assuming that the rated charging voltage of the handheld electronic device is 5V, the charging circuit 110 outputs a charging voltage of 5V from its power output terminal PO. During the charging process, the control unit 122 measures the voltage of the electrical path to obtain a measured voltage. In this embodiment, the measured voltage is 5V. In addition, control unit 122 also measures the voltage across the impedance unit 124 and calculates a value of the current flowing through the impedance unit 124 accordingly. When the calculated current value does not reach the current limit value (in this embodiment, 3 A) corresponding to the measured voltage (in this embodiment, 5V), the control unit 122 controls the switch 126 to be continuously turned on by the control signal CS1. On the other hand, when the calculated current value reaches the current limit value (in this embodiment, 3 A) corresponding to the measured voltage (in this embodiment, 5V), the control unit 122 controls the switch 126 to be turned off by the control signal CS1.

As another example, assuming that the rated charging voltage of the handheld electronic device is 9V, the charging circuit 110 outputs a charging voltage of 9V from its power output terminal PO. During the charging process, the control unit 122 measures the voltage of the electrical path to obtain a measured voltage. In this embodiment, the measured voltage is 9V. In addition, the control unit 122 also measures the voltage across the impedance unit 124 and calculates a value of the current flowing through the impedance unit 124 accordingly. When the calculated current value does not reach the current limit value (in this embodiment, 2 A) corresponding to the measured voltage (in this embodiment, 9V), the control unit 122 controls the switch 126 to be continuously turned on by the control signal CS1. On the other hand, when the calculated current value reaches the current limit value (in this embodiment, 2 A) corresponding to the measured voltage (in this embodiment, 9V), the control unit 122 controls the switch 126 to be turned off by the control signal CS1.

In another embodiment, the handheld electronic device also supports different charging voltages (e.g., 5V, 9V, and 12V), so the charging circuit 110 communicates with the handheld electronic device to obtain the optimum charging voltage of the handheld electronic device. Assuming that the optimum charging voltage of the handheld electronic device is 9V, the charging circuit 110 outputs a charging voltage of 9V to charge the handheld electronic device.

Referring to FIG. 1 again, optionally, the control unit 112 may be further electrically coupled to the charging circuit 110, so that the charging circuit 110 is able to disable the charging circuit 110 by the control signal CS2 when the calculated current value reaches the current limit value corresponding to the measured voltage.

It is worth mentioning that the connection interface 130 can be implemented by a USB (universal serial bus) connection interface, the impedance unit 124 can be implemented by a resistor, and the switch 126 can be implemented by a MOS transistor (metal-oxide-semiconductor field-effect transistor), a BJT (bipolar junction transistor) or a relay. However, these implementations are not intended to limit the present invention. When a relay is used as the switch 126, a terminal of the excitation coil of the relay is used as the control terminal 126-3 of the switch 126, and the other terminal of the excitation coil is electrically coupled to, for example, the reference potential VSS. In addition, the positions of the impedance unit 124 and the switch 126 can be reversed, as long as the electrical coupling relationships of the two components are also adjusted accordingly.

As can be seen from the above description, the charging device with adaptive current limiting protection of the present invention supports different charging voltages and performs current limiting protection under different charging voltages. In addition, as can be seen from the contents of Table 1, a product is obtained by multiplying a voltage value by a corresponding current limit value, and the products are different from each other. In other words, the charging device with adaptive current limiting protection of the present invention is adapted to perform current limiting protection under different output power conditions, not for constant output power condition only.

Figure 2:
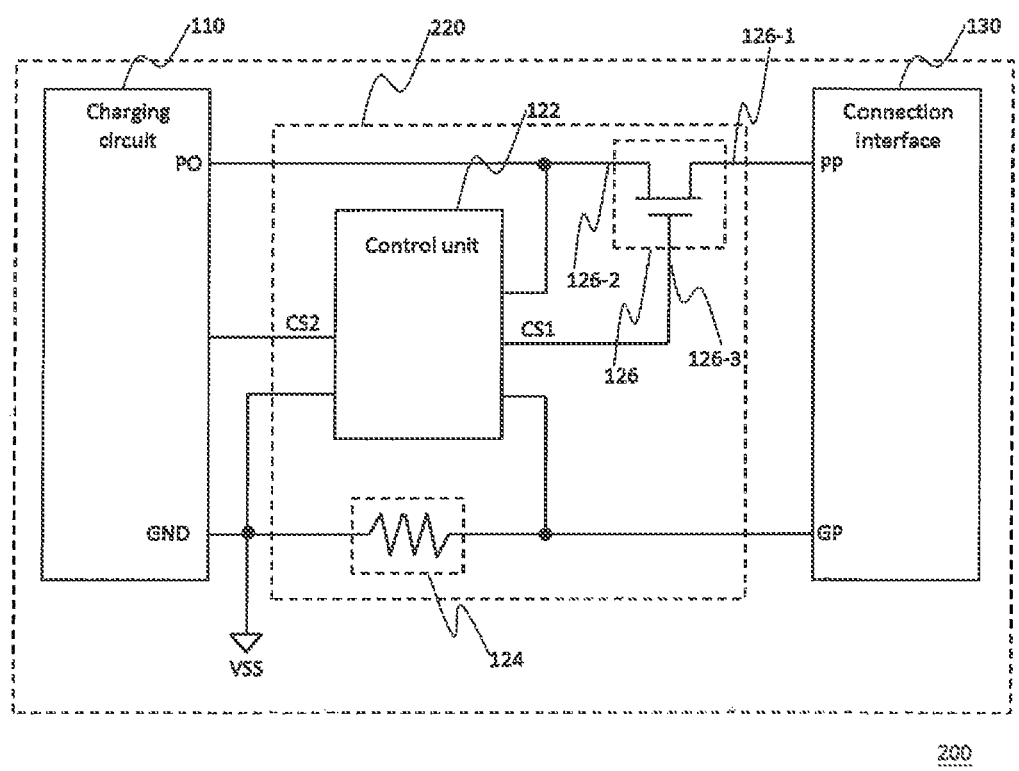
FIG. 2 is a charging device with adaptive current limiting protection according to another embodiment of the present invention.

FIG. 2 is a charging device with adaptive current limiting protection according to another embodiment of the present invention. In FIG. 2, the same reference numerals as those in FIG. 1 are denoted as the same object or signal. Compared with the charging device 100 shown in FIG. 1, the impedance unit 124 of the adaptive current limiting protection circuit 220 of the charging device 200 shown in FIG. 2 is electrically coupled between the ground terminal GND and the ground pin GP, and the switch 126 is electrically coupled between the power output terminal PO and the power pin PP. In this embodiment, the first terminal 126-1 of the switch 126 is electrically coupled to the power pin PP, the second terminal 126-2 of the switch 126 is electrically coupled to the power output terminal PO, and the control terminal 126-3 of the switch 126 is used to receive the control signal CS1. In addition, the control unit 122 is electrically coupled to an electrical path between the power pin PP and the power output terminal PO, so as to measure the voltage of the electrical path. In this embodiment, the control unit 122 is electrically coupled to the second terminal 126-2 of the switch 126 for measuring the voltage of the electrical path. However, this coupling manner is not intended to limit the present invention. Those skilled in the art should know that the control unit 122 can be electrically coupled to the first terminal 126-1 of the switch 126 for measuring the voltage of the electrical path.

It is worth mentioning that, in FIG. 2, the positions of the impedance unit 124 and the switch 126 can be reversed, as long as the electrical coupling relationships of the two components are also adjusted accordingly.

Figure 3:
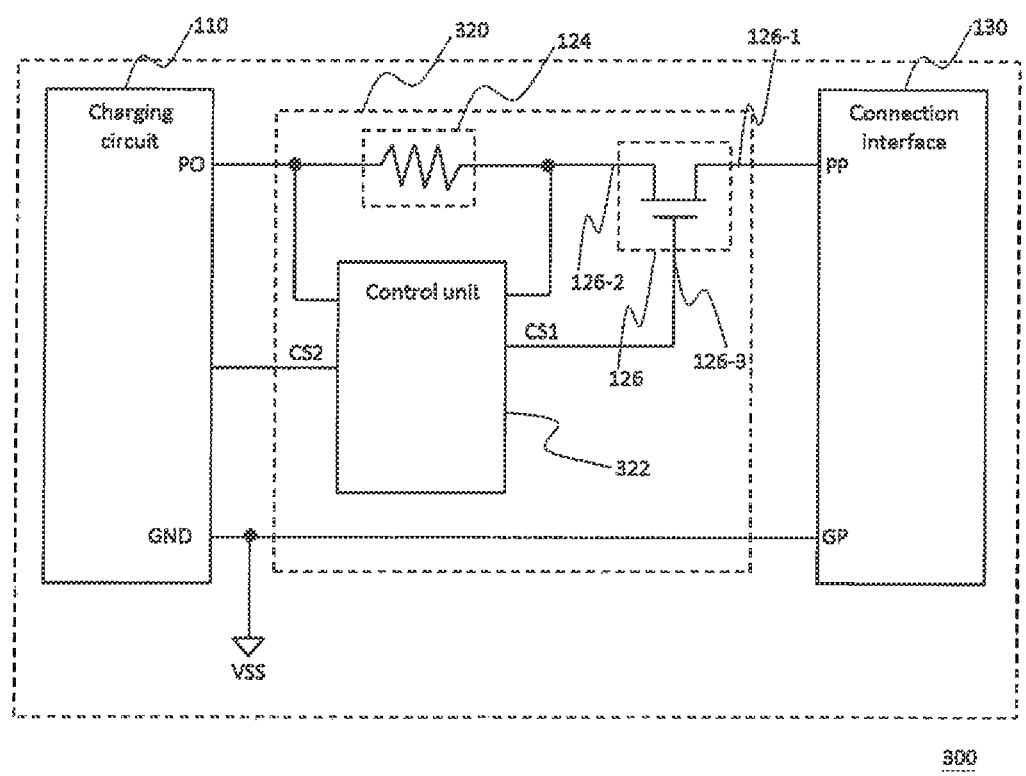
FIG. 3 is a charging device with adaptive current limiting protection according to still another embodiment of the present invention.

FIG. 3 is a charging device with adaptive current limiting protection according to still another embodiment of the present invention. In FIG. 3, the same reference numerals as those in FIG. 1 are denoted as the same object or signal. Compared with the charging device 100 shown in FIG. 1, the impedance unit 124 and the switch 126 of the adaptive current limiting protection circuit 320 of the charging device 300 shown in FIG. 3 are electrically coupled between the power output terminal PO and the power pin PP. In this embodiment, the first terminal 126-1 of the switch 126 is electrically coupled to the power pin PP, the control terminal 126-3 of the switch 126 is used to receive the control signal CS1, and the impedance unit 124 is electrically coupled between the second terminal 126-2 of the switch 126 and the power output terminal PO. The resistance of the impedance unit 124 must be small enough to cause a small voltage drop across the impedance unit 124, so as to prevent the voltage transferred from the connection interface 130 to the handheld electronic device (not shown) from being too low and exceeding the allowed tolerance of the charging voltage of the handheld electronic device.

In addition, the control unit 322 is electrically coupled to an electrical path between the power pin PP and the power output terminal PO, so as to measure the voltage of the electrical path. In this embodiment, since the impedance unit 124 is a part of the electrical path, the voltage at either terminal of the impedance unit 124 can be regarded as the voltage of the electrical path when the control unit 322 has measured the voltage across the impedance unit 124. It is worth mentioning that, in FIG. 3, the positions of the impedance unit 124 and the switch 126 can be reversed, as long as the electrical coupling relationships of the two components are also adjusted accordingly.

Figure 4:
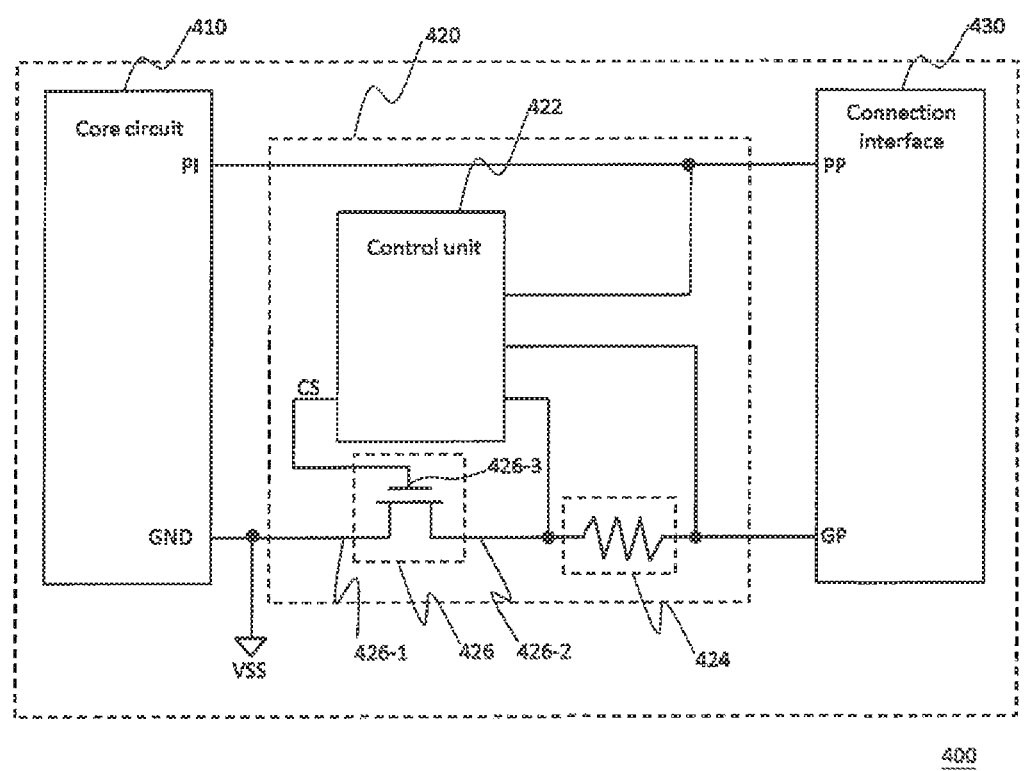
FIG. 4 is a handheld electronic device with adaptive current limiting protection according to an embodiment of the invention.

FIG. 4 is a handheld electronic device with adaptive current limiting protection according to an embodiment of the invention. Referring to FIG. 4, the handheld electronic device 400 comprises a core circuit 410, an adaptive current limiting protection circuit 420, and a connection interface 430. The core circuit 410 comprises a power input terminal PI and a ground terminal GND, and the ground terminal GND is electrically coupled to the reference potential VSS.

In addition, the core circuit 410 also comprises a rechargeable battery (not shown) and supports different charging voltages. The core circuit 410 is used to perform all functions defined by a designer. For example, assuming that the handheld electronic device 400 is a mobile phone, the core circuit 410 is used to perform all functions required for the mobile phone. In addition, assuming that the handheld electronic device 400 is a camera, the core circuit 410 is used to perform all the functions required for the camera.

Referring to FIG. 4 again, the connection interface 430 comprises a power pin PP and a ground pin GP, and the power pin PP is electrically coupled to the power input terminal PI. The adaptive current limiting protection circuit 420 comprises a control unit 422, an impedance unit 424, and a switch 426. The first terminal 426-1 of the switch 426 is electrically coupled to the ground terminal GND, and the impedance unit 424 is electrically coupled between the second terminal 426-2 of the switch 426 and the ground pin GP.

As for the control unit 422, it is electrically coupled to the control terminal 426-3 of the switch 426 and two terminals of the impedance unit 424, and is electrically coupled to an electrical path between the power pin PP and the power input terminal PI. The control unit 122 stores a plurality of voltage values and a plurality of different corresponding current limit values, as shown in Table 1 above.

When a charging device (not shown) supporting different charging voltages is electrically coupled to the connection interface 430, the core circuit 410 communicates with the charging device through at least one data pin (not shown) of the connection interface 430, so as to inform the charging device of its optimum charging voltage. Assuming that the optimum charging voltage of the handheld electronic device 400 is 5V, the charging device outputs a charging voltage of 5V to the handheld electronic device 400. During the charging process, the control unit 422 measures the voltage of the electrical path to obtain a measured voltage. In this embodiment, the measured voltage is 5V. In addition, control unit 422 also measures the voltage across the impedance unit 424 and calculates a value of the current flowing through the impedance unit 424 accordingly. When the calculated current value does not reach the current limit value (in this embodiment, 3 A) corresponding to the measured voltage (in this embodiment, 5V), the control unit 422 controls the switch 426 to be continuously turned on by the control signal CS. On the other hand, when the calculated current value reaches the current limit value (in this embodiment, 3 A) corresponding to the measured voltage (in this embodiment, 5V), the control unit 422 controls the switch 426 to be turned off by the control signal CS.

As another example, assuming that the optimum charging voltage of the handheld electronic device 400 is 9V, the charging device outputs a charging voltage of 9V to the handheld electronic device 400. During the charging process, the control unit 422 measures the voltage of the electrical path to obtain a measured voltage. In this embodiment, the measured voltage is 9V. In addition, the control unit 422 also measures the voltage across the impedance unit 424 and calculates a value of the current flowing through the impedance unit 424 accordingly. When the calculated current value does not reach the current limit value (in this embodiment, 2 A) corresponding to the measured voltage (in this embodiment, 9V), the control unit 422 controls the switch 426 to be continuously turned on by the control signal CS. On the other hand, when the calculated current value reaches the current limit value (in this embodiment, 2 A)

corresponding to the measured voltage (in this embodiment, 9V), the control unit 422 controls the switch 426 to be turned off by the control signal CS.

In another embodiment, the handheld electronic device 400 supports a rated charging voltage (e.g., 5V) only, so the core circuit 410 communicates with the charging device to inform the charging device of its rated charging voltage. Assuming that the rated charging voltage of the handheld electronic device 400 is 5V, the charging device outputs a charging voltage of 5V to charge the handheld electronic device 400.

It is worth mentioning that the connection interface 430 can be implemented by a USB connection interface, the impedance unit 424 can be implemented by a resistor, and the switch 426 can be implemented by a MOS transistor, a BJT or a relay. However, these implementations are not intended to limit the invention. When a relay is used as the switch 426, a terminal of the excitation coil of the relay is used as the control terminal 426-3 of the switch 426, and the other terminal of the excitation coil is electrically coupled to, for example, the reference potential VSS. In addition, the positions of the impedance unit 424 and the switch 426 can be reversed, as long as the electrical coupling relationships of the two components are also adjusted accordingly.

As can be seen from the above description, the handheld electronic device with adaptive current limiting protection of the present invention supports different charging voltages and performs current limiting protection under different charging voltages. In addition, as can be seen from the contents of Table 1, a product is obtained by multiplying a voltage value by a corresponding current limit value, and the products are different from each other. In other words, the handheld electronic device with adaptive current limiting protection of the present invention is adapted to perform current limiting protection under different input power conditions, not for constant input power condition only.

Figure 5:
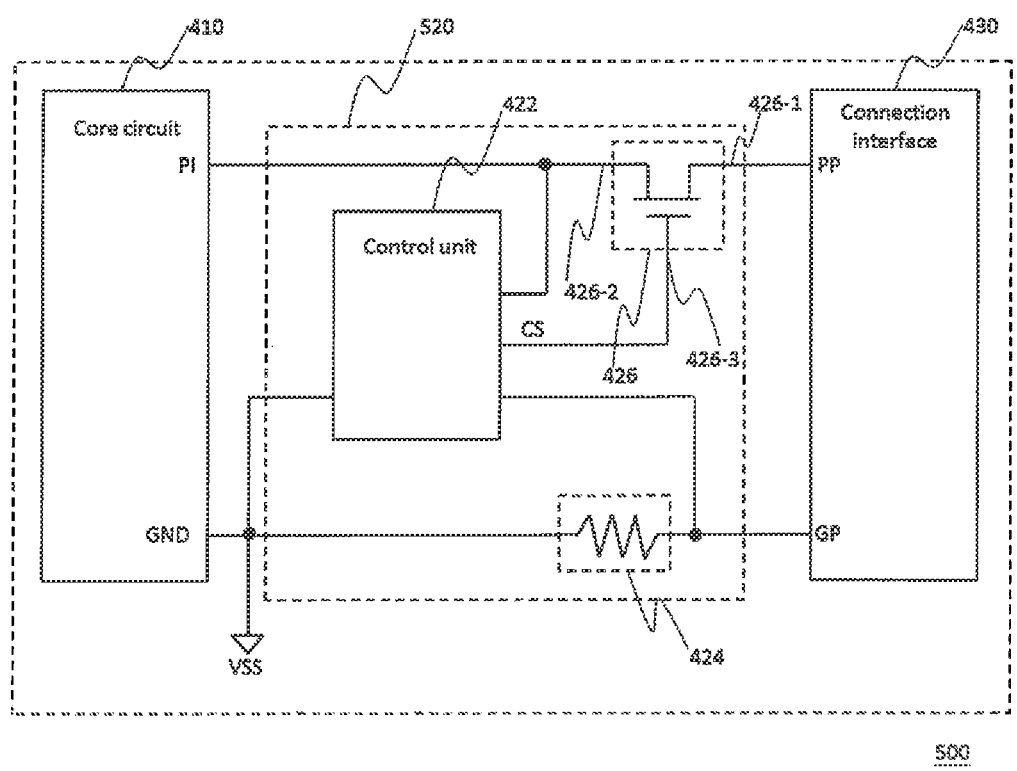
FIG. 5 is a handheld electronic device with adaptive current limiting protection according to another embodiment of the present invention.

FIG. 5 is a handheld electronic device with adaptive current limiting protection according to another embodiment of the present invention. In FIG. 5, the same reference numerals as those in FIG. 4 are denoted as the same object or signal. Compared with the handheld electronic device 400 shown in FIG. 4, the impedance unit 424 of the adaptive current limiting protection circuit 520 of the handheld electronic device 500 shown in FIG. 5 is electrically coupled between the ground terminal GND and the ground pin GP, and the switch 426 is electrically coupled between the power input terminal PI and the power pin PP. In this embodiment, the first terminal 426-1 of the switch 426 is electrically coupled to the power pin PP, the second terminal 426-2 of the switch 426 is electrically coupled to the power input terminal PI, and the control terminal 426-3 of the switch 426 is used to receive the control signal CS. In addition, the control unit 422 is electrically coupled to an electrical path between the power pin PP and the power input terminal PI, so as to measure the voltage of the electrical path. In this embodiment, the control unit 422 is electrical coupled to the second terminal 426-2 of the switch 426 for measuring the voltage of the electrical path. However, this coupling manner is not intended to limit the present invention. Those skilled in the art should know that the control unit 422 can be electrically coupled to the first terminal 426-1 of the switch 426 for measuring the voltage of the electrical path.

It is worth mentioning that, in FIG. 5, the positions of the impedance unit 424 and the switch 426 can be reversed, as long as the electrical coupling relationships of the two components are also adjusted accordingly.

Figure 6:
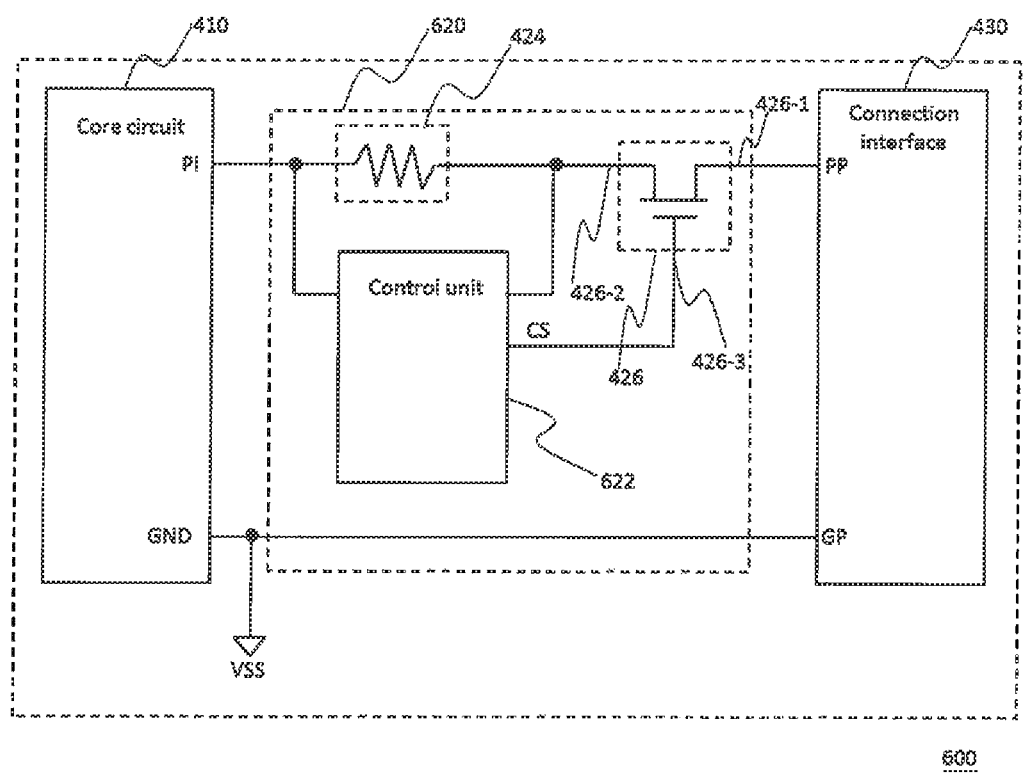
FIG. 6 is a handheld electronic device with adaptive current limiting protection according to still another embodiment of the present invention.

FIG. 6 is a handheld electronic device with adaptive current limiting protection according to still another embodiment of the present invention. In FIG. 6, the same reference numerals as those in FIG. 4 are denoted as the same object or signal. Compared with the handheld electronic device 400 shown in FIG. 4, the impedance unit 424 and the switch 426 of the adaptive current limiting protection circuit 620 of the handheld electronic device 600 shown in FIG. 6 are electrically coupled between the power input terminal PI and the power pin PP. In this embodiment, the first terminal 426-1 of the switch 426 is electrically coupled to the power pin PP, the control terminal 426-3 of the switch 426 is used to receive the control signal CS, and the impedance unit 424 is electrically coupled between the second terminal 426-2 of the switch 426 and the power input terminal PI. The resistance of the impedance unit 424 must be small enough to cause a small voltage drop across the impedance unit 424, so as to prevent the voltage transferred from the connection interface 430 to the core circuit 410 from being too low and exceeding the allowed tolerance of the charging voltage of the core circuit 410.

In addition, the control unit 622 is electrically coupled to an electrical path between the power pin PP and the power input terminal PI, so as to measure the voltage of the electrical path. In this embodiment, since the impedance unit 424 is a part of the electrical path, the voltage at either terminal of the impedance unit 424 can be regarded as the voltage of the electrical path when the control unit 622 has measured the voltage across the impedance unit 424. It is worth mentioning that, in FIG. 6, the positions of the impedance unit 424 and the switch 426 can be reversed, as long as the electrical coupling relationships of the two components are also adjusted accordingly.

In summary, since both of the charging device and the handheld electronic device of the present invention have the adaptive current limiting protection circuit, the control unit turns off the above switch when the current value calculated from the voltage across the impedance unit reaches the current limit value corresponding to the measured voltage of the electrical path, achieving the current limiting protection.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A charging device with adaptive current limiting protection, comprising:
   a connection interface, having a power pin and a ground pin;
   a charging circuit, having a power output terminal and a ground terminal electrically coupled to a reference potential; and
   an adaptive current limiting protection circuit, comprising:
      an impedance unit, electrically coupled between the power pin and the power output terminal, or electrically coupled between the ground pin and the ground terminal;
      a switch, electrically coupled between the power pin and the power output terminal, or electrically coupled between the ground pin and the ground terminal; and a control unit, electrically coupled to the switch and two terminals of the impedance unit, and electrically coupled to an electrical path between the power pin and the power output terminal, wherein the control unit stores a plurality of voltage values and a plurality of different corresponding current limit values, the control unit is configured to measure the voltage of the electrical path to obtain a measured voltage, and the control unit is further configured to measure the voltage across the impedance unit to calculate a current value, and when the current value reaches the current limit value corresponding to the measured voltage, the control unit turns off the switch.

2. The charging device with adaptive current limiting protection as claimed in claim 1, wherein a product is obtained by multiplying a voltage value by a corresponding current limit value, and the products are different from each other.

3. The charging device with adaptive current limiting protection as claimed in claim 1, wherein the control unit is further electrically coupled to the charging circuit, and when the current value reaches the current limit value corresponding to the measured voltage, the control unit further disables the charging circuit.

4. The charging device with adaptive current limiting protection as claimed in claim 1, wherein the connection interface comprises a USB connection interface.

5. The charging device with adaptive current limiting protection as claimed in claim 1, wherein the impedance unit comprises a resistor.

6. The charging device with adaptive current limiting protection as claimed in claim 1, wherein the switch comprises a MOS transistor, a BJT or a relay.

7. A handheld electronic device with adaptive current limiting protection, comprising:
 a connection interface, having a power pin and a ground pin;
 a core circuit, having a power input terminal and a ground terminal electrically coupled to a reference potential; and
 an adaptive current limiting protection circuit, comprising:
  an impedance unit, electrically coupled between the power pin and the power input terminal, or electrically coupled between the ground pin and the ground terminal;
  a switch, electrically coupled between the power pin and the power input terminal, or electrically coupled between the ground pin and the ground terminal; and
  a control unit, electrically coupled to the switch and two terminals of the impedance unit, and electrically coupled to an electrical path between the power pin and the power input terminal, wherein the control unit stores a plurality of voltage values and a plurality of different corresponding current limit values, the control unit is configured to measure the voltage of the electrical path to obtain a measured voltage, and the control unit is further configured to measure the voltage across the impedance unit to calculate a current value, and when the current value reaches the current limit value corresponding to the measured voltage, the control unit turns off the switch.

8. The handheld electronic device with adaptive current limiting protection as claimed in claim 7, wherein a product is obtained by multiplying a voltage value by a corresponding current limit value, and the products are different from each other.

9. The handheld electronic device with adaptive current limiting protection as claimed in claim 7 wherein the connection interface comprises a USB connection interface.

10. The handheld electronic device with adaptive current limiting protection as claimed in claim 7 wherein the impedance unit comprises a resistor.

11. The handheld electronic device with adaptive current limiting protection as claimed in claim 7, wherein the switch comprises a MOS transistor, a BJT or a relay.

* * * * *